US012623562B2

(12) United States Patent
Ji et al.

(10) Patent No.: US 12,623,562 B2
(45) Date of Patent: May 12, 2026

(54) MULTIPLEXING TOPOLOGICAL STRUCTURE FOR CONTROLLING DUPLEX-WINDING MOTOR AND CHARGING ON BOARD CHARGER

(71) Applicant: HANGZHOU CITY UNIVERSITY, Hangzhou (CN)

(72) Inventors: Feifan Ji, Hangzhou (CN); Qingyu Song, Hangzhou (CN); Yanjun Li, Hangzhou (CN)

(73) Assignee: HANGZHOU CITY UNIVERSITY, Hangzhou (CN)

( * ) Notice: Subject to any disclaimer, the term of this patent is extended or adjusted under 35 U.S.C. 154(b) by 165 days.

(21) Appl. No.: 18/419,374

(22) Filed: Jan. 22, 2024

(65) Prior Publication Data

US 2024/0208343 A1    Jun. 27, 2024

Related U.S. Application Data

(63) Continuation of application No. PCT/CN2022/120259, filed on Sep. 21, 2022.

(51) Int. Cl.
*B60L 53/24* (2019.01)
*H02J 7/14* (2006.01)
(Continued)

(52) U.S. Cl.
CPC ............ *B60L 53/24* (2019.02); *H02J 7/1446* (2013.01); *H02P 23/26* (2016.02); *H02P 25/22* (2013.01); *H02P 27/08* (2013.01)

(58) Field of Classification Search
CPC .......... B60L 77/00; B60L 11/18; B60L 50/15; B60L 50/16; H02J 7/06; H02K 19/10;
(Continued)

(56) References Cited

U.S. PATENT DOCUMENTS

2004/0206571 A1    10/2004 Nishizaki et al.
2019/0126760 A1    5/2019 Najmabadi et al.
(Continued)

FOREIGN PATENT DOCUMENTS

CN    1974261 A    6/2007
CN    102158035 A    8/2011
(Continued)

OTHER PUBLICATIONS

Japanese Office Action for Application No. 2023-570071, mailed Nov. 1, 2024 (8 pages).
(Continued)

*Primary Examiner* — Said Bouziane
(74) *Attorney, Agent, or Firm* — Wiersch Law Group

(57)    ABSTRACT

The present disclosure discloses a multiplexing topological structure for simultaneously realizing control of a duplex-winding motor and charging of an on board charger. By controlling the connecting and disconnecting state of a specific relay, the bidirectional switching between the control topology of the duplex-winding motor and the charging topology of the on board charger is realized. In the duplex-winding motor control mode, the topology is divided into a battery module, a duplex-winding motor power control module, a duplex-winding motor power control module, a duplex-winding motor winding module and a duplex-winding motor winding module; in the on board charger charging mode, the topological structure is divided into a electric supply module, a PFC inverter circuit module, an inverter module, an isolation transformer module, a rectifier module and a battery module.

9 Claims, 3 Drawing Sheets

(51) Int. Cl.
H02P 23/26 (2016.01)
H02P 25/22 (2006.01)
H02P 27/08 (2006.01)

(58) Field of Classification Search
CPC .. H02K 3/04; H02K 3/28; H02P 29/08; H02P 29/18; H02P 29/22; H02P 23/04; H02P 27/08; H02P 25/22; H02P 27/06
See application file for complete search history.

(56) References Cited

U.S. PATENT DOCUMENTS

| | | | |
|---|---|---|---|
| 2021/0384855 A1 | 12/2021 | Chen et al. | |
| 2023/0299702 A1* | 9/2023 | Hao | B60L 53/16 |

FOREIGN PATENT DOCUMENTS

| | | |
|---|---|---|
| CN | 102931716 A | 2/2013 |
| CN | 107086834 A | 8/2017 |
| CN | 107509393 A | 12/2017 |
| CN | 109747453 A | 5/2019 |
| CN | 112398400 A | 2/2021 |
| CN | 113422550 A | 9/2021 |
| CN | 113726248 A | 11/2021 |
| CN | 113783489 A | 12/2021 |
| CN | 115158055 A | 10/2022 |
| JP | 2022531025 A | 7/2022 |
| WO | 2013077221 A1 | 5/2013 |

OTHER PUBLICATIONS

International Search Report (PCT/CN2022/120259); Date of Mailing: Dec. 27, 2022.

First Office Action(CN202310204773.0); Date of Mailing: May 10, 2023.

Notice Of Allowance(CN202310204773.0); Date of Mailing: May 23, 2023.

Time-Delay-Compensation-About-AC-Drive-Vector-Control-System; Date of Mailing: May 31, 2011.

Digital-Implementation-of-Single-Current-Sensor-Based-IPMSM-Drive-With-Sampling-Error-Delay-Compensation; Date of Mailing: Nov. 1, 2015.

* cited by examiner

MULTIPLEXING TOPOLOGICAL STRUCTURE FOR CONTROLLING DUPLEX-WINDING MOTOR AND CHARGING ON BOARD CHARGER

CROSS-REFERENCE TO RELATED APPLICATIONS

The present application is a continuation of International Application No. PCT/CN2022/120259, filed on Sep. 21, 2022, the content of which is incorporated herein by reference in their entirety.

TECHNICAL FIELD

The present disclosure belongs to the field of motor control and vehicle-mounted charging devices and in particular, to a multiplexing topological structure for simultaneously realizing control of a duplex-winding motor control and charging of an on board charger (OBC).

BACKGROUND

In recent years, countries all over the world have continuously promoted the development of clean energy and green transportation to cope with the worsening energy crisis and environmental pollution. With the transformation of automobile industry, electric vehicles have gradually become an important direction in the development of modern automobiles, and many countries are actively promoting the popularization of electric vehicles. During the transition period, how to effectively charge electric vehicles is a key problem in solving users' mileage anxiety.

At present, the charging of electric vehicles mainly includes two forms: charging piles and on board chargers. The construction of charging piles is not perfect at present, and on board chargers have the advantages of portable charging, which can be used as a transitional state before the large-scale realization of charging piles.

Due to the space limitation and cost consideration of electric vehicles, the actual charging efficiency of the on board charger equipped in the vehicle is not high at present. Among the existing technologies, many researchers have also made many explorations on the optimization of on board charger and achieved certain results, but there is still significant room for improvement.

Based on this, in view of the above discussion, it is desired to obtain a new alternative solution of on board charger, which can effectively solve the space limitation of electric vehicles, reduce the overall hardware cost, and improve the charging efficiency as much as possible.

SUMMARY

In view of the shortcomings of the prior art, the object of the present disclosure is to provide a multiplexing topological structure for simultaneously realizing the control of a duplex-winding motor and the charging of a on board charger. According to the present disclosure, a set of hardware equipment is multiplexed to a great extent, and the functional requirements of duplex-winding motor control and on board charger charging are realized at the same time, so that the equipment space is saved and considerable cost advantage is achieved.

The object of the present disclosure is achieved through the following technical solution: a multiplexing topological structure for simultaneously realizing the control of a duplex-winding motor and the charging of a on board charger includes:

in a control mode of a duplex-winding motor, the multiplexing topology is divided into a battery module, a duplex-winding motor power control module 1, a duplex-winding motor power control module 2, a duplex-winding motor winding module 1 and a duplex-winding motor winding module 2.

In the battery module, the anode and cathode of the battery BAT are respectively led out in two paths. One path of the positive electrode HV+ 1 is connected to the upper end of a first capacitor C1 in the duplex-winding motor power control module 1 through a first switch K1, and a connection point 1 is led out to be connected with a sixth switch K6 of the duplex-winding motor power control module 2; the other path of the positive electrode HV− is directly connected to the upper end of a second capacitor C2 in the duplex-winding motor power control module 2. One path of the negative electrode HV− is connected to the lower end of the first capacitor C1 in the duplex-winding motor power control module 1 through a second switch K2, and a connection point 2 is let out to be connected to a tenth switch K10 of the duplex-winding motor power control module 2, and the other path of the negative electrode HV− is directly connected to the lower end of the second capacitor C2 in the duplex-winding motor power control module 2.

In the duplex-winding motor power control module 1, the upper and lower ends of the first capacitor C1 are connected with the upper and lower ends of the bridge arms of the three-phase inverter circuit. A basic block of each phase bridge arm is composed of a power switch tube and a freewheeling diode. The basic block UT1 is used as a U-phase upper bridge arm and a basic block UB1 is used as a U-phase lower bridge arm, and the two blocks are connected with each other; the midpoint of the U-phase bridge arm is connected with an one-phase winding La1 of the duplex-winding motor winding module 1. A basic block VT1 is used as a V-phase upper bridge arm, and a basic block VB1 is used as a V-phase lower bridge arm. The two blocks are connected with each other, and the midpoint of the V-phase bridge arm is connected with an one-phase winding Lb1 of the duplex-winding motor winding module 1. A basic block WT1 is used as a W-phase upper bridge arm, and a basic block WB1 is used as a W-phase lower bridge arm. The two blocks are connected with each other, and the midpoint of the W-phase bridge arm is connected with an one-phase winding Lc1 of the duplex-winding motor winding module 1.

In the duplex-winding motor winding module 1, the three-phase windings La1, Lb1 and Lc1 are connected in a star connection mode, and double-pole double-throw switches (K3 and K4) are provided in the link where the winding La1 is connected with the star midpoint, wherein the third switch K3 controls the connection between the winding La1 and the star midpoint, the fourth switch K4 controls the connection between the winding La1 and the connection point N, and the connection point N is connected with the N terminal of the electric supply module AC. The three-phase windings La1, Lb1 and Lc1 of the two-winding motor winding module 1 have the same electrical resistance and inductance characteristics. By controlling the fourth switch K4 and the seventh switch K7 to be opened, the input of the electric supply module is shielded.

In the duplex-winding motor power control module 2, the upper and lower ends of the second capacitor C2 are connected with the upper and lower ends of the three-phase inverter circuit bridge arm. The basic block of each phase bridge arm is composed of a power switch tube and a freewheeling diode. A basic block UT2 is used as a U-phase upper bridge arm, a basic block UB2 is used as a U-phase lower bridge arm, and the two blocks are connected with each other; double-pole double-throw switches (K5, K6) are provided at the upper end of the U-phase bridge arm, wherein the fifth switch K5 controls the connection between the upper end of the U-phase upper bridge arm UT2 and the upper end of the second capacitor C2, and the sixth switch K6 controls the connection between the upper end of the U-phase upper bridge arm UT2 and the connection point 1; the lower end of the U-phase bridge arm is equipped with double-pole double-throw switches (K9, K10), wherein the ninth switch K9 controls the connection between the lower end of the U-phase lower bridge arm UB2 and the lower end of the second capacitor C2, and the tenth switch K10 controls the connection between the lower end of the U-phase lower bridge arm UB2 and the connection point 2; the midpoint of the U-phase bridge arm is connected with one-phase winding La2 of the duplex-winding motor winding module 2, and the link is equipped with double-pole double-throw switches (K7 and K8), wherein the seventh switch K7 controls the connection between the midpoint of the U-phase bridge arm and the connection point L, and the connection point L is connected with the L terminal of the electric supply module AC, and the eighth switch K8 controls the connection between the midpoint of the U-phase bridge arm and the one-phase winding La2 of the duplex-winding motor winding module 2. A basic block VT2 is used as a V-phase upper bridge arm, and a basic block VB2 is used as a V-phase lower bridge arm. The two blocks are connected with each other, and the midpoint of the V-phase bridge arm is connected with one-phase winding Lb2 of the duplex-winding motor winding module 2. A basic block WT2 is used as a W-phase upper bridge arm, and a basic block WB2 is used as a W-phase lower bridge arm. The two blocks are connected with each other, and the midpoint of the W-phase bridge arm is connected with one-phase winding Lc2 of the duplex-winding motor winding module 2.

In the duplex-winding motor winding module, the three-phase windings La2, Lb2 and Lc2 are connected in a star connection mode. The three-phase windings La2, Lb2 and Lc2 of the two-winding motor winding module 2 have the same electrical resistance and inductance characteristics. The number of turns of the three-phase winding in the two-winding motor winding module 1 is different from that in the two-winding motor winding module 2, which is used to control the turn ratio of the primary side and the secondary side of the isolation transformer module when switching to the on board charger charging mode, so as to realize the boost function of the isolation transformer module.

In the on board charger charging mode, the multiplexing topological structure is divided into a electric supply module, a PFC inverter circuit module, an inverter module, an isolation transformer module, a rectifier module and a battery module.

In the electric supply module, the N terminal is connected with the winding La1 in the PFC inverter circuit module through the fourth switch K4, and the L terminal is connected with the midpoint of the second bridge arm in the PFC inverter circuit module through the seventh switch K7. The connection point L is connected with the L terminal of the electric supply module AC; the connection point N is connected with the N terminal of the electric supply module AC.

In the PFC inverter circuit module, the winding La1 in the duplex-winding motor winding module 1 and the winding La2 in the duplex-winding motor winding module 2 in the duplex-winding motor control mode are multiplexed, and they are separated from the star connection mode by controlling the third switch and the eighth switch to be opened respectively. The winding La1 in the duplex-winding motor winding module is used as a resistive inductance element; it further includes U-phase upper and lower bridge arms UT1 and UB1 in the duplex-winding motor power control module 1, U-phase upper and lower bridge arms UT2 and UB2 in the duplex-winding motor power control module 2, and a first capacitor C1 in the duplex-winding motor power control module 1; the upper and lower ends of two-phase (the U-phase in duplex-winding motor power control module 1 and the U-phase in duplex-winding motor power control module 2) bridge arms are connected with the upper and lower ends of the first capacitor C1.

The inverter module includes V-phase upper and lower bridge arms VT1 and VB1 and W-phase upper and lower bridge arms WT1 and WB1 in the duplex-winding motor power control module 1 under the control mode of the multiplexing duplex-winding motor.

The isolation transformer module includes a winding Lb1 and a winding Lc1 in a duplex-winding motor winding module 1 and a winding Lb2 and a winding Lc2 in a duplex-winding motor winding module 2 under the control mode of the multiplexing duplex-winding motor; two-phase windings Lb1 and Lc1 are connected in series to form the primary side of the transformer, and two-phase windings Lb2 and Lc2 are connected in series to form the secondary side of the transformer. The number of winding turns is reasonably configured to realize the boost demand of the isolation transformer module; specifically, the number of turns of the three-phase winding in the duplex-winding motor winding module 1 is different from that in the duplex-winding motor winding module 2, which is used to control the turn ratio of the primary side and the secondary side of the isolation transformer module when switching to the on board charger charging mode, so as to realize the boosting function of the isolation transformer module.

The rectifier module, under the control mode of the multiplexing duplex-winding motor, includes V-phase upper and lower bridge arms VT2 and VB2, W-phase upper and lower bridge arms WT2 and WB2 in the duplex-winding motor power control module 2, and a second capacitor C2 in the duplex-winding motor power control module 2; the upper and lower ends of two-phase (the V-phase and W-phase in the duplex-winding motor power control module) bridge arms are connected with the upper and lower ends of the second capacitor C2.

In the battery module, the battery in the duplex-winding motor control mode is multiplexed, and the anode and cathode of the battery are connected with the upper and lower ends of the second capacitor C2.

The present disclosure has the following beneficial effects:

(1) the topological structure of the present disclosure greatly multiplexes a set of hardware equipment, and at the same time realizes the control of the duplex-winding motor and the charging function of the on board charger, thus effectively saving the overall layout space;

(2) the topological structure of the present disclosure greatly reduces the overall cost by multiplexing hardware devices and adding a small amount of relay switches, while realizing the requirements of motor control and battery charging; and (3) compared with the on board charger commonly used in the market, the charging efficiency under the topological structure of the present disclosure is higher.

DESCRIPTION OF EMBODIMENTS

Figure 1:
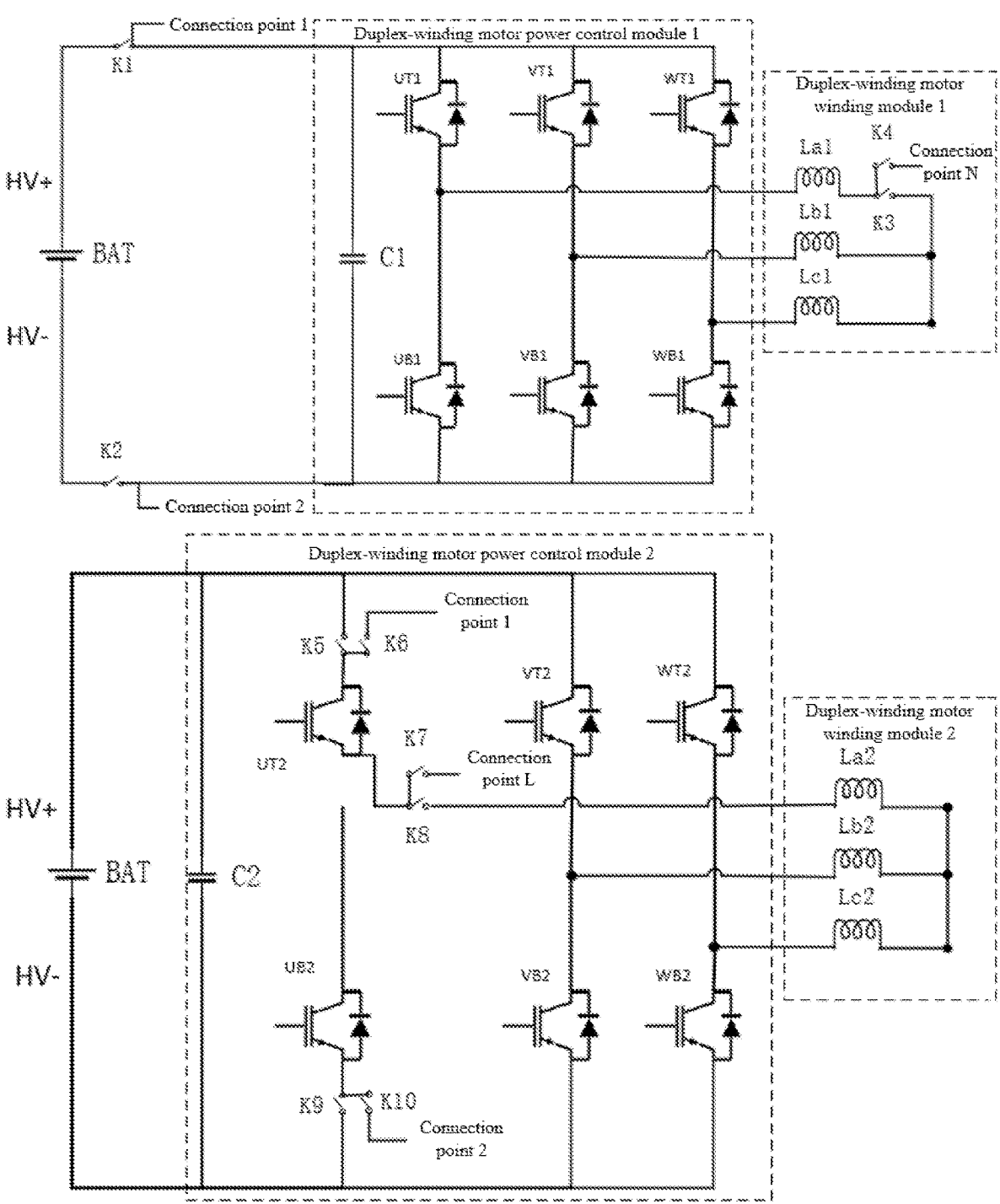
FIG. 1 is a topology diagram in a control mode of a duplex-winding motor.

The present disclosure will be described in further detail with reference to the accompanying drawings:

The present disclosure relates to a multiplexing topological structure for simultaneously realizing the control of a duplex-winding motor and the charging of an on board charger, which includes the following:

As shown in FIG. 1, in the control mode of a duplex-winding motor, the multiplexing topology includes a battery module, a duplex-winding motor power control module 1, a duplex-winding motor winding module 1, a duplex-winding motor power control module 2, and a duplex-winding motor winding module 2. The battery module drives and controls the duplex-winding motor winding module 1 and the duplex-winding motor winding module 2 through the duplex-winding motor power control module 1 and the duplex-winding motor power control module 2 respectively.

Battery module: the anode and cathode of the battery BAT are respectively led out in two paths. One path of the positive electrode HV+ 1 is connected to the upper end of a first capacitor C1 in the duplex-winding motor power control module 1 through a first switch K1, and a connection point 1 is led out to be connected with a sixth switch K6 of the duplex-winding motor power control module 2; the other path of the positive electrode HV+ is directly connected to the upper end of a second capacitor C2 in the duplex-winding motor power control module 2. One path of the negative electrode HV− is connected to the lower end of the first capacitor C1 in the duplex-winding motor power control module 1 through a second switch K2, and a connection point 2 is let out to be connected to a tenth switch K10 of the duplex-winding motor power control module 2, and the other path of the negative electrode HV− is directly connected to the lower end of the second capacitor C2 in the duplex-winding motor power control module 2. In the control mode of the duplex-winding motor, the first relay K1 and the second relay K2 are controlled to be closed, and the cathode and anode of the battery are respectively connected to the connection point 1 and the connection point 2 to provide direct current voltage for the three-phase inverter circuit.

Two-winding motor power control module 1 is composed of a first capacitor C1 and three-phase bridge arms, each phase is divided into an upper bridge arm and a lower bridge arm, each bridge arm is connected by a power switch tube and a freewheeling diode, six bridge arms correspond to UT1 and UB1, VT1 and VB1, WT1 and WB1 respectively, and the midpoints of the three-phase bridge arms are respectively connected to three-phase windings La1, Lb1 and Lc1 of the two-winding motor winding module 1; by controlling the gate signals of the power tube of each bridge arm, the duplex-winding motor power control module 1 outputs PWM (Pulse WidthModulation) waves to drive the duplex-winding motor winding module 1.

The duplex-winding motor winding module 1 is composed of three-phase symmetrical windings La1, Lb1 and Lc1 in star connection; double-pole double-throw switches (K3, K4) are provided in the link between the winding La1 and the star midpoint, wherein the third relay K3 controls the connection between the winding La1 and the star midpoint, and the fourth relay K4 controls the connection between the winding La1 and the connection point N. The fourth relay K4 is turned off and the third relay K3 is turned on, so as to ensure that the duplex-winding motor winding module 1 runs in the motor drive mode; by controlling the fourth relay K4 and the seventh relay K7 to turn off, the input of the electric supply module is shielded. The three-phase windings La1, Lb1 and Lc1 of the two-winding motor winding module 1 have the same electrical impedance and inductance characteristics.

Two-winding motor power control module 2: at this time, the fifth relay K5 is closed, the sixth relay K6 is opened, the seventh relay K7 is opened, the eighth relay K8 is closed, the ninth relay K9 is closed, and the tenth relay K10 is opened. In this relay state, the duplex-winding motor power control module consists of a second capacitor C2 and three-phase bridge arms, each phase is divided into an upper bridge arm and a lower bridge arm, each bridge arm is formed by connecting a power switch tube and a freewheeling diode, and the six bridge arms correspond to UT2 and UB2, VT2 and VB2, WT2 and WB2 respectively. The midpoints of the three-phase bridge arms are respectively connected to the three-phase windings La2, Lb2 and Lc2 of the duplex-winding motor winding module 2; By controlling the gate signals of the power tubes of each bridge arm, the duplex-winding motor power control module outputs PWM waves to drive the duplex-winding motor winding module.

Two-winding motor winding module 2: composed of three-phase symmetrical windings La2, Lb2 and Lc2 in a star connection, and is controlled by the PWM drive from the two-winding motor winding module 2. The three-phase windings La2, Lb2 and Lc2 of the two-winding motor winding module 2 have the same electrical resistance and inductance characteristics.

Figure 2:
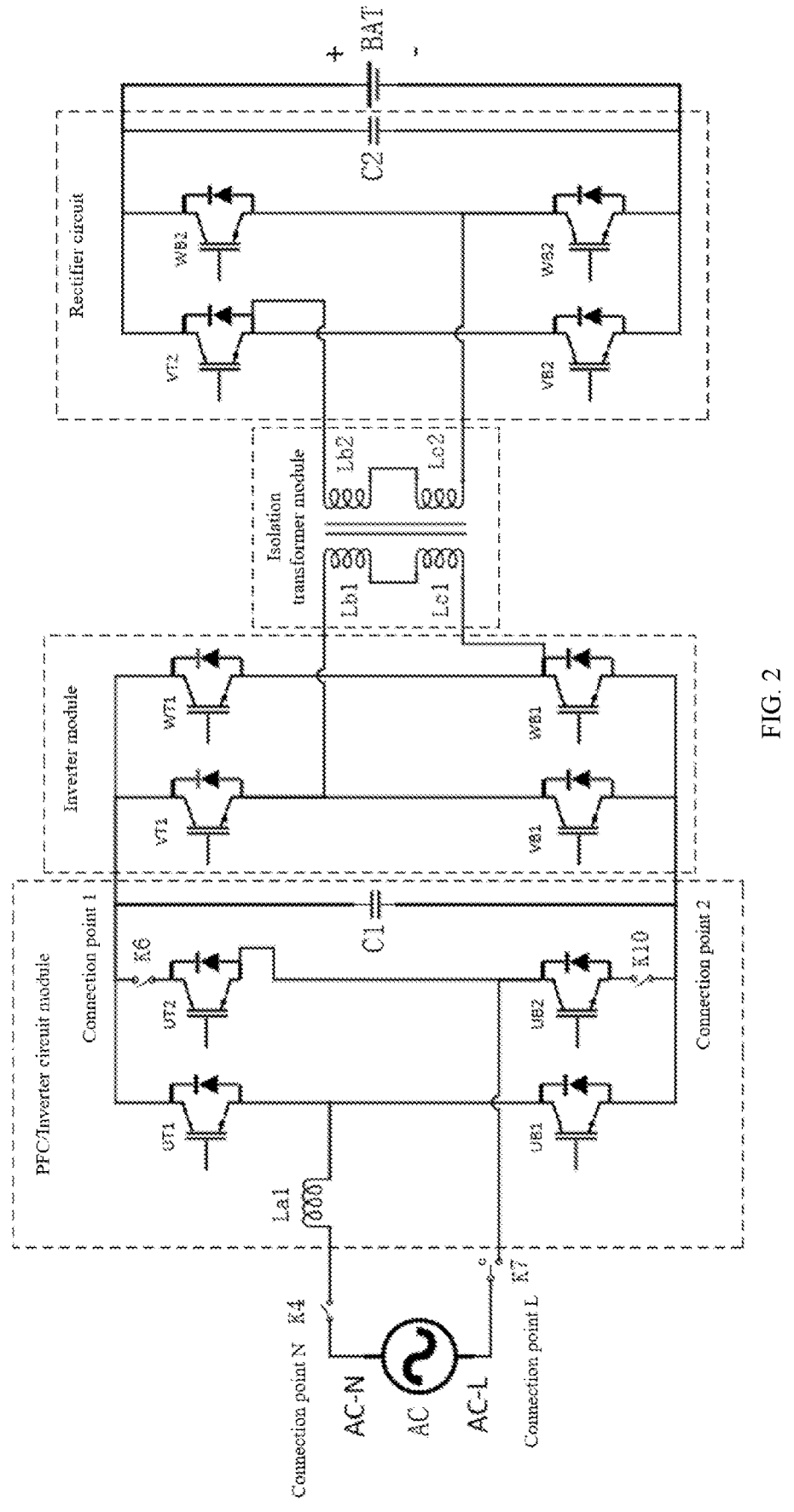
FIG. 2 is a topology diagram in an on board charger charging mode.

As shown in FIG. 2, in the on board charger charging mode, the multiplexing topology includes a mains supply module, a PFC inverter circuit module, an inverter module, an isolation transformer module, a rectifier module and a battery module.

Electric supply module: the N terminal is connected with the winding La1 in the PFC inverter circuit module through the fourth relay K4, and the L terminal is connected with the midpoint of the second bridge arm in the PFC inverter circuit module through the seventh relay K7. In the on board charger charging mode, the fourth relay K4 and the seventh relay K7 are controlled to be closed, and the third relay K3 and the eighth relay K8 are controlled to be opened. The N terminal of the electric supply is connected to the connection point N, and the L terminal of the electric supply is connected to the connection point L, so as to realize the power transmission to the PFC inverter circuit.

PFC inverter circuit module: by controlling the third relay K3 and the eighth relay K8 to turn off, the one-phase winding La1 of the duplex-winding motor winding module 1 and the winding La2 of the duplex-winding motor winding module 2 are separated from the star connection mode. The winding La1 in the duplex-winding motor winding module is used as a resistive inductance element; it further includes U-phase upper and lower bridge arms UT1 and UB1 in the duplex-winding motor power control module 1, U-phase upper and lower bridge arms UT2 and UB2 in the duplex-winding motor power control module 2, and a first capacitor C1 in the duplex-winding motor power control module 1. The sixth relay K6 and the tenth relay K10 are controlled to be turned on, and the fifth relay K5 and the ninth relay K9 are controlled to be turned off, so that the U-phase upper and lower bridge arms of the duplex-winding motor power control module 2 are respectively connected to the connection point 1 and the connection point 2. At this time, UT1 and UB1, UT2 and UB2 jointly form two-phase bridge arms, and the upper and lower ends of the two-phase bridge arm are connected in parallel with the first capacitor C1, so as to jointly realize the inversion boost of PFC (Power Factor Correction).

Inverter module: the V-phase upper and lower bridge arms VT1 and VB1 and the W-phase upper and lower bridge arms WT1 and WB1 in the duplex-winding motor power control module 1 form two-phase bridge arms, which realize the inverter function by controlling the gate signals of each power switch tube and output high-frequency alternating voltage.

Isolation transformer module: due to the turning off of the third relay K3 and the eighth relay K8, the winding Lb1 and the winding Lc1 in the two-winding motor winding module 1 are automatically connected in series to form the primary side of the transformer, and the winding Lb2 and the winding Lc2 in the two-winding motor winding module 2 are automatically connected in series to form the secondary side of the transformer; by reasonably configuring the number of turns of two groups of windings, the transformation function of isolation transformer can be realized. Specifically, the number of turns of the three-phase winding in the duplex-winding motor winding module 1 is different from that in the duplex-winding motor winding module 2, which is used to control the turn ratio of the primary side and the secondary side of the isolation transformer module when switching to the on board charger charging mode, so as to realize the boosting function of the isolation transformer module.

Rectifier module: two-phase bridge arms are composed of V-phase upper and lower bridge arms VT2 and VB2 and W-phase upper and lower bridge arms WT2 and WB2 in the duplex-winding motor power control module. The upper and lower ends of the two-phase bridge arm are connected with the two ends of the second capacitor C2 respectively, the rectifier function is realized by controlling the gate signals of each power switch tube, and the direct current charging voltage is output to charge the battery.

Battery module: the anode and cathode of the battery are connected with the upper and lower ends of the second capacitor C2. At this time, the first relay K1 and the second relay K2 are controlled to be turned off, and the battery is only connected with the rectifier module in structure to receive the electric power output by the rectifier module for charging.

Figure 3:
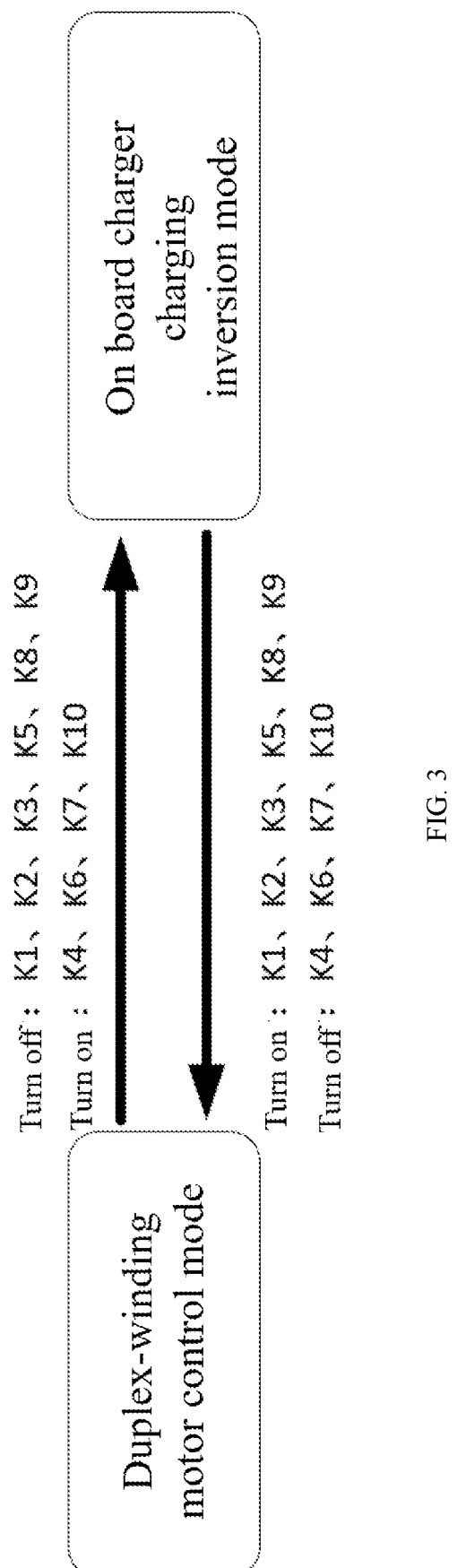
FIG. 3 is a schematic diagram of relay control operating conditions for two-mode switching.

As shown in FIG. 3, based on the above-mentioned multiplexing topology, turning off K1, K2, K3, K5, K8 and K9, turning on K4, K6, K7 and K10 can switch the mode to the on board charger charging mode, turning on K1, K2, K3, K5, K8 and K9, turning off K4, K6, K7 and K10 can switch the node to the control mode of the duplex-winding motor.

All relay switches involved in the multiplexing topology of the present disclosure can be replaced by any devices with switch properties.

The present disclosure is not limited to the above-mentioned embodiments, and all other embodiments obtained by ordinary people in the field without creative work are within the protection scope of the patent of the present disclosure in the same or similar way as the above-mentioned embodiments of the present disclosure.

What is claimed is:

1. A multiplexing topological structure for controlling a duplex-winding motor and charging an on board charger, comprising: a battery module, a first duplex-winding motor power control module, a first duplex-winding motor winding module, a second duplex-winding motor power control module, a second duplex-winding motor winding module, an electric supply module, a PFC inverter circuit module, an inverter module, an isolation transformer module, and a rectifier module;

wherein in a duplex-winding motor control mode, only the battery module, the first duplex-winding motor power control module, the first duplex-winding motor winding module, the second duplex-winding motor power control module and second duplex-winding motor winding module of the multiplexing topological structure are in an operating state; the battery module is configured to simultaneously provide direct-current drive to the first duplex-winding motor power control module and the second duplex-winding motor power control module under control of a switching device, and the first duplex-winding motor power control module and the second duplex-winding motor power control module are configured to simultaneously provide pulse-width modulation (PWM) drive to the first duplex-winding motor winding module and the second duplex-winding motor winding module, respectively;

wherein in an on board charger charging mode, only the electric supply module, the PFC inverter circuit module, the inverter module, the isolation transformer module, the rectifier module and the battery module of the multiplexing topological structure are in an operating state; V-phase upper and lower bridge arms and W-phase upper and lower bridge arms of the first duplex-winding motor power control module are configured, under control of the switching device, to form an inverter circuit for inverting an output voltage of a power factor correction (PFC) inverter circuit, V-phase upper and lower bridge arms and W-phase upper and lower bridge arms of the second duplex-winding motor power control module form two-phase bridge arms, the two-phase bridge arms are connected with a second capacitor in the second duplex-winding motor power control module to constitute a rectifier circuit, and the rectifier circuit is configured to rectify a high-frequency alternating current output by an isolation transformer; two-phase windings in the first two-winding motor winding module are connected in series under control of the switching device to constitute a primary side of the isolation transformer, and two-phase windings in the second two-winding motor winding module are connected in series under control of the switching device to constitute a secondary side of the isolation transformer; the isolation transformer module is configured to provide a voltage boost by selecting a number of wire turns of two groups of three-phase windings;

and wherein a third switch is provided between an one-phase winding in the first duplex-winding motor winding module and a star connection midpoint; an eighth switch is provided between a midpoint of an one-phase bridge arm in the second duplex-winding motor winding module and an one-phase winding of the second duplex-winding motor winding module; by controlling on-off status of the third switch and the eighth switch, the duplex-winding motor are capable of forming a star connection of windings in the duplex-winding motor control mode, and being connected in series with windings in the on board charger charging mode to form a structural switching of the primary side and the secondary side of the isolation transformer.

2. The multiplexing topological structure for controlling a duplex-winding motor and charging an on board charger according to claim 1, wherein when a first switch and a second switch are closed, the battery module is simultaneously connected with the first duplex-winding motor power control module and the second duplex-winding motor power control module to provide direct-current drive to the first duplex-winding motor power control module and the second duplex-winding motor power control module; when a fourth switch and a seventh switch are opened, an input of the electric supply module is shielded.

3. The multiplexing topological structure for controlling a duplex-winding motor and charging an on board charger according to claim 1, wherein the first duplex-winding motor power control module and the second duplex-winding motor power control module are configured, under control of the switching device, to form a three-phase inverter circuit structure, and the three-phase inverter circuit structure is configured to output a desired PWM wave under direct current drive of the battery module.

4. The multiplexing topological structure for controlling a duplex-winding motor and charging an on board charger according to claim 1, wherein a fifth switch and a ninth switch are provided in an one-phase bridge arm of the second duplex-winding motor power control module, and the second duplex-winding motor power control module is configured to control the fifth switch and the ninth switch to close, so as to connect three-phase inverter bridge arms in parallel.

5. The multiplexing topological structure for controlling a duplex-winding motor and charging an on board charger according to claim 1, wherein a fourth switch is provided between an one-phase winding of the first duplex-winding motor winding module and a star connection midpoint; a seventh switch is provided between a midpoint of an one-phase bridge arm in the second duplex-winding motor winding module and an one-phase winding of the second duplex-winding motor winding module; by controlling the fourth switch and the seventh switch to be closed, an electric supply alternating current power is capable of being input in the on board charger charging mode.

6. The multiplexing topological structure for controlling a duplex-winding motor and charging an on board charger according to claim 1, wherein a sixth switch and a tenth switch are provided in an one-phase bridge arm of the second duplex-winding motor power control module, and by controlling on-off status of the sixth switch and the tenth switch, the one-phase bridge arm of the second duplex-winding motor power control module is capable of being connected in parallel with an one-phase bridge arm and a first capacitor of the first duplex-winding motor power control module to switch between a three-phase inverter bridge and a PFC inverter circuit bridge structure.

7. The multiplexing topological structure for controlling a duplex-winding motor and charging an on board charger according to claim 1, wherein by controlling on-off status of relevant switching devices, two-phase bridge arms among three-phase bridge arms for inverter output in the first duplex-winding motor winding module and a bridge circuit structure of the inverter module in the on board charger charging mode are capable of being switched; by control on-off status of relevant switching devices, two-phase bridge arms among three-phase bridge arms for inverter output in the second duplex-winding motor winding module and a bridge circuit structure of the rectifier module in the on board charger charging mode are capable of being switched.

8. The multiplexing topological structure for controlling a duplex-winding motor and charging an on board charger according to claim 1, wherein in the duplex-winding motor control mode:

the battery module is configured to simultaneously connect upper and lower ends of three-phase bridge arms of the first duplex-winding motor power control module and the second duplex-winding motor power control module by controlling a first switch and a second switch to be closed to achieve direct current power transmission thereto;

the second duplex-winding motor power control module is configured to connect three-phase bridge arms of the second duplex-winding motor power control module by controlling a fifth switch and a ninth switch to be closed, and a sixth switch and a tenth switch to be opened; midpoints of the three-phase bridge arms of the second duplex-winding motor power control module are configured to connect with three-phase windings of the second duplex-winding motor winding module, respectively, by controlling a seventh switch to be closed and an eighth switch to be opened; bridge arms are formed by connecting a power switch tube and a freewheeling diode, and a gate of the power switch tube of each phase bridge arm is controlled for PWM wave output; the second duplex-winding motor winding module consists of a star connection of the three-phase windings;

the first duplex-winding motor winding module is configured to dorm a star connection of three-phase windings of the first duplex-winding motor winding module by controlling a third switch to be closed and a fourth switch to be opened.

9. The multiplexing topological structure for controlling a duplex-winding motor and charging an on board charger according to claim 1, wherein in the on board charger charging mode:

the electric supply module is configured to connect an electric supply to two ends of the PFC inverter circuit module by controlling a fourth switch and a seventh switch to be closed and a first switch and a second switch to be opened, so as to input alternating current power;

the PFC inverter circuit module is configured to separate an one-phase winding of the first duplex-winding motor winding module and an one-phase winding of the second duplex-winding motor winding module from a star connection mode by controlling a third switch and an eighth switch to be opened; the PFC inverter circuit module is further configured to control a sixth switch and a tenth switch to be closed, and a fifth switch and a ninth switch to be opened, so that U-phase upper and lower bridge arms and a first capacitor in the first duplex-winding motor power control module and U-phase upper and lower bridge arms in the second duplex-winding motor power control module are combined to constitute the PFC inverter circuit, and the PFC inverter circuit is configured to achieve PFC function by controlling a gate of a power switch tube of each bridge arm.

* * * * *